United States Patent

[11] 3,578,338

[72] Inventor Yoshihiro Ueno
Hujisawa, Japan

[21] Appl. No. 784,163
[22] Filed Dec. 16, 1968
[45] Patented May 11, 1971

[73] Assignee Victor Company of Japan, Limited
Moriya-Cho Kanagawa-Ku, Yokohama, Japan

[32] Priority Dec. 19, 1967
[33] Japan
[31] 42/105912

[54] TAPE CARTRIDGE REJECTION APPARATUS
7 Claims, 4 Drawing Figs.

[52] U.S. Cl. ........ 274/4
[51] Int. Cl. ........ G11b 5/78
[50] Field of Search ........ 274/4, 11

[56] References Cited

UNITED STATES PATENTS

| | | | |
|---|---|---|---|
| 2,009,024 | 11/1961 | Eash | 274/4(C) |
| 3,083,269 | 3/1963 | Gaubert | 274/11(E) |
| 3,385,534 | 5/1968 | Staar | 274/4(E) |

*Primary Examiner*—Harry N. Haroian
*Attorneys*—Glascock, Downing & Seebold, John C. Holman and Marvin R. Stern

ABSTRACT: A tape cartridge rejection apparatus having a plunger mainly operably by a discharge current of a condenser for rejecting and pushing out a tape cartridge, a normally-opened switch being closed when said tape cartridge is loaded in the tape player unit before rejection, resistor such as an incandescent lamp greatly variable in value corresponding to the flowing time of electric current, and a power source which charges electricity in said condenser through said resistance. The resistance serves to limit the electric current supplied to said plunger when said tape cartridge is not rejected although the plunger is energized and to prevent the burning of said plunger.

INVENTOR
YOSHIHIRO UENO

BY Holman, Glascock, Downing & Seebold
ATTORNEYS

TAPE CARTRIDGE REJECTION APPARATUS

The present invention relates to an apparatus for rejecting a tape cartridge and more particularly to improvements in electric circuits of an apparatus for rejecting a tape cartridge in use for a tape cartridge-type tape player or recorder, which apparatus is operable at any desired time to reject the tape cartridge by pushing the same from the tape player.

Generally, a tape cartridge-type tape player has therein a capstan which, upon insertion of a tape cartridge, into the player, cooperates with a pinch roller mounted within the cartridge to forcible pinch a magnetic tape and drive said tape for reproducing and playing operation. With a conventional tape cartridge-type tape player, if a tape cartridge is maintained within the tape player after its playing operation, the pinch roller of the cartridge is also kept forcibly in contact with the capstan and would be deformed. Such deformation adversely affects the quality of reproduced sounds. It has, therefore, been necessary to manually withdraw a tape cartridge from the tape player at times such as after completion of the reproducing operation and discharge the pinch roller of said tape cartridge from an urging contact with the capstan in the tape player.

On the other hand, there is a requirement that a tape cartridge-type player, if designed for an automobile, receive a cartridge completely therein so that even a part of the cartridge may not remain projecting from the tape player unit. It is also required to withdraw the tape cartridge without difficulty even when it is deeply inserted in the tape player unit. For satisfying the requirement, therefore, it has been necessary to provide an automatically or manually operable mechanism for pushing out and rejecting a tape cartridge at any time such as at a desired time or at the time of completion of the reproducing operation of the tape cartridge.

Hitherto there has been contemplated a tape cartridge rejection apparatus capable of manually or automatically pushing the forward end of a tape cartridge out of an associated tape player and rejecting the same from the tape player by a rejection lever at a desired time when reproduction is finished and disengaging a pinch roller in said tape cartridge from its pressing contact with the capstan in the tape player.

The above-described rejection apparatus has been already disclosed in our copending applications Ser. No. 668,380, now U.S. Pat. No. 3,492,005 and No. 708,685 respectively filed Sept. 18, 1967 and Feb. 27, 1968, which were filed by this applicant.

The the described apparatus for rejecting a tape cartridge, there is employed a solenoid for operating a rejection lever. Such solenoid makes sufficient intermittent and instantaneous operations and a solenoid coil for operating the solenoid is designed to assure a short period of time during which an electric current flows therethrough. Therefore, when a continuous flow of electricity is supplied in the solenoid coil for some reason such as will be described hereinafter, the solenoid coil will be burnt.

The present invention is provided to overcome such drawbacks. The electric current is limited when a continuous flow of electric current is applied in the solenoid coil for some reason and the solenoid coil is thus prevented from being burnt. In normal operation the apparatus also can assure an accurate rejection of a tape cartridge without limiting the electric current.

Therefore, a primary object of the present invention is to provide a tape cartridge rejection apparatus which can be prevented from burning of a solenoid coil for causing a plunger to make intermittent and instantaneous operation.

Another object of the present invention is to provide a tape cartridge rejection apparatus wherein for preventing a solenoid coil from burning, an incandescent lamp is connected in series with the solenoid coil, the value of resistance of said lamp being greatly variable in the course of flowing time of electric current.

A further object of the present invention is to provide a tape cartridge rejection apparatus wherein said solenoid coil is mainly operable by a discharge current of a condenser which is charged through an incandescent lamp and wherein the electric current is limited and decreased by increase of resistance in the incandescent lamp even when continuous electric current is supplied in the solenoid coil for some reason.

Another object of the present invention is to provide a tape cartridge rejection apparatus which is operable to charge electricity to a condenser without limiting the electric current through an incandescent lamp which is low in resistance when the rejection apparatus starts its operation and to thereby avoid the difficulties in repetitive operations.

Still further object of the present invention is to provide a tape cartridge rejection apparatus which can utilize said incandescent lamp as an alarm lamp for warning of operational errors.

Other objects and features of the present invention will be apparent from the following description with reference to the accompanying drawings in which.

Figure 1:
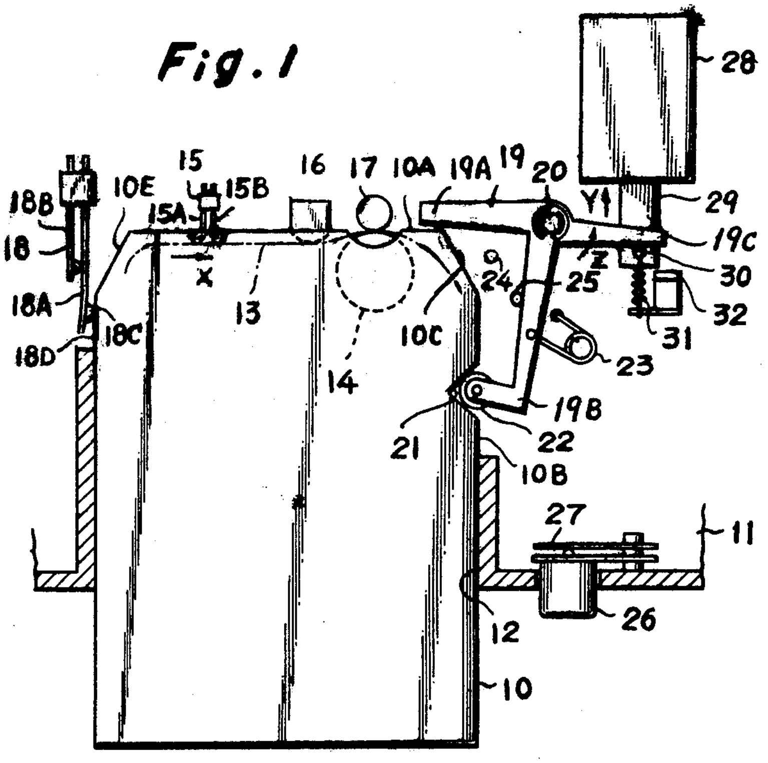
FIG. 1 is a plan view of the essential part of an embodiment of a tape cartridge-type player to which the present invention is applicable.

Referring now particularly to FIG. 1, a tape cartridge 10 is inserted in an opening 12 of a chassis 11 of a tape cartridge-type tape player unit and loaded in the interior of the player unit. The tape cartridge 10 houses a web of a tape 13 and a pinch roller 14 therein.

Portions of the tape player chassis 11 will now be described. A detection contact 15 consists of a pair of contacts 15A, 15B for detecting the position of a conductive sensing tape (not shown) which is adhered on said tape 13 at a position corresponding to the termination of reproduction. The detection contact 15, a reproducing magnetic head 16 and a capstan 17 rotated by a capstan motor (not shown) are provided on the chassis 11 at positions respectively contacting the tape 13 in the tape cartridge 10 which is loaded within said chassis.

At this time the tape 13 is pressed between the pinch roller 14 and the capstan 17 and urged to travel in the direction indicated by the arrow X.

A power source switch 18 consists of contacts 18A, 18B and said contact 18A has a projection 18C at the forward end thereof.

When the tape cartridge 10 is not loaded in the chassis 11, the contacts 18A, 18B are separated and the switch 18 is opened. When the tape cartridge 10 is loaded into the chassis 11, the projection 18C contacts a tapered portion 10E of the tape cartridge and engages a sidewall 18D of said tape cartridge, whereupon said contacts 18A, 18B are brought into contact with each other and the power source switch 18 is closed.

A generally T-shaped rejection lever 19 is rotatably pivoted onto the chassis 11 by means of a shaft 20 and has an integral cartridge pushing arm 19A positioned adjacent to the forward end 10A of the cartridge 10 when the cartridge 10 is loaded in the chassis 11, a tape cartridge holding arm 19B having a roller 22 at its forward bent portion in engagement with a V-shaped notch 21 in a sidewall 10B of the cartridge, and a lever arm 19C extending opposite to said pushing arm 19A relative to the shaft 20. Further, upon insertion of the tape cartridge 10 into the chassis 11, the roller 22 slightly rotates along the tapered portion 10C and ultimately engages with the V-notch 21 and holds the cartridge 10 in its operating position in stabilized state. A click spring 23 is fastened to the chassis 11 on one end and to the tape cartridge holding arm 19B on the other end. The click spring urges the roller 22 against the sidewall 10B of the tape cartridge 10 by an adequate force. Stops 24, 25 respectively limit the extent of rotation of the cartridge pushing arm 19A and the cartridge holding arm 19B. A manually operable button 26 is provided projecting outside the chassis 11 and when said button is pushed a manually operable button switch 27, provided in parallel with the detection contact 15 as later described, is closed. A solenoid 28 has a plunger 29 slidably engaged with the solenoid coil and the plunger 29 is provided with a pin 30 capable of engaging with and pushing the lever arm 19C. A spring 31 extends between the pin 30 and a stop 32 on the chassis 11.

Figure 2:
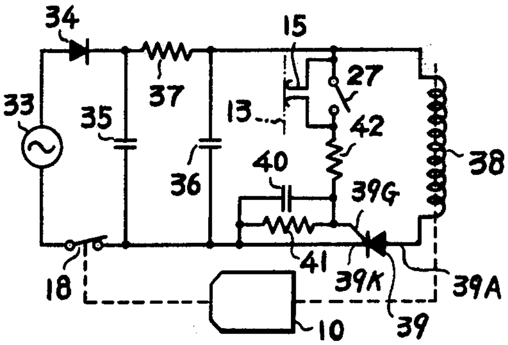
FIG. 2 is an illustrative diagrammatical circuit in a tape cartridge rejection apparatus applicable to the player as shown in FIG. 1.

FIG. 2 shows one example of an electrical circuit for driving the solenoid coil within the solenoid 28.

When the tape cartridge 10 is loaded in the chassis 11 through the opening 12, the projection 18C of the contact 18A of the power source switch 18 is brought into contact with the sidewall 18D of the tape cartridge 10 thereby closing the power source switch 18 and forming a closed circuit comprising an AC power source 33, a rectifier 34, a smoothing circuit consisting of condensers 35, 36 and a resistor 37, a solenoid coil 38 of the solenoid 38 and a silicon controlled rectifier element (SCR)39. The silicon controlled rectifier element 39 has an anode 39A, a cathode 39K and a gate electrode 39G. Between the gate electrode 39G and the cathode 39K, a condenser 40 and a resistor 41 are connected in parallel. Further, a resistor 42 is connected between the gate electrode 39G and the parallel circuit of the manually operable button switch 27 and the contact 15 closed by the aforementioned conductive sensing tape adhered on the tape 13. The solenoid coil 38 is connected between the manually operable button switch 27 or contact 15 and the anode 39A.

The gate electrode 39G of the above-described rectifier element 39 is adapted to receive a supply of a voltage divided by a resistor 41 and a resistor 42 upon closing of the manually operable button switch 27 or the contact 15.

Ordinarily the resistance in the forward direction of the rectifier element 39 is so high that an electric current does not flow into the solenoid coil 38 and the solenoid 28 does not actuate.

When the magnetic tape 13 has run and the reproduction of recorded information is completed, the conductive sensing tape adhered on the magnetic tape at the position corresponding to the termination of reproduction of information recorded thereon is brought into contact with the contact 15 and said contact 15 is electrically closed or the manually operable button switch 27 is manually or mechanically closed, whereupon an instantaneous electrical current produced at the time of closing flows to the gate electrode 39G of the rectifier element 39 through the resistor 42. Once the electric current has flowed to the gate electrode 39G, the resistance in the normal direction of the rectifier element 39 is decreased and a current flows to the solenoid coil 38. And, even after opening of a contact 15 or switch 27, the current continues to flow to the solenoid coil 38 in accordance with characteristics of the rectifier element 39, then the solenoid coil 38 actuates and the plunger 29 is pulled into the solenoid 28 in the direction indicated by the arrow Y against the force of the spring 31. Thus the lever arm 19C is rotated in the direction indicated by the arrow Z by means of the pin 30 provided on the plunger 29, and consequently the roller 22 on the forward end of the holding arm 19B is released from engagement with the V-notch 21 on the sidewall 10B of the tape cartridge 10. Until the pushing arm 19A engages the stop 24, the forward end of said pushing arm 19A pushes the forward end 10A of the tape cartridge to thereby push the tape cartridge 10 out of the tape player unit. With the rejection of the tape cartridge 10 assured by this pushing operation, the contact 18A of the power source switch 18 is detached from the contact 18B along the tapered portion 10E of the tape cartridge and the switch 18 is opened. Then the solenoid coil 38 becomes inoperative and the plunger 29 moves in reverse direction to the arrow Y by force of the spring 31 and returns to the previous position to be engaged with the stop 32.

After the plunger 29 returns to its previous position the click spring 23 makes a reverse rotation in the direction of force so that the rejection lever 19 remains in the rotated state and when the tape cartridge 10 is loaded again in the tape player, the pushing arm 19A is pushed by the forward end 10A and returns to its previous position.

Where the width or thickness of the tape cartridge 10 exceeds a predetermined value in respect to configuration and dimensions of the cartridge and where friction of the tape player unit against the tape cartridge loaded therein is too large, the cartridge may fail to be pushed out although the solenoid coil 38 is supplied electricity and the plunger 29 is urged to operate. Thus if the cartridge 10 is not completely rejected or pushed out, the power source switch 18 does not open but remains closed so that the electric current continues to flow to the solenoid coil 38. Since the solenoid coil is adapted for a short flowing period of electric current, it tends to burn out due to continuous flowing of electric current.

For preventing the burning of the solenoid coil 38 in such occasion, it would be usually considered to employ a condenser 37 of large capacitance and a resistor 36 of great resistance to thereby render the current operating the plunger which flows into the solenoid coil 38 mainly as a discharge current of the condenser 36 and limit and decrease the electric current of direct continuous flowing to the solenoid coil 38 by means of the resistor 37.

When a time constant of the condenser 36 and the resistor 37 is too large, the charging time of a condenser 36 becomes too long. In this occasion a drawback is that when flowing an electric current to the solenoid coil 38 to operate the plunger 29 intermittently and repetitively for a relatively short period of time, it is not possible to make the plunger 29 an instantaneous operation.

Figure 3:
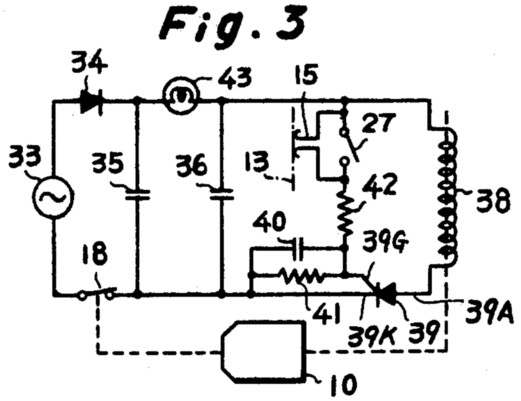
FIG. 3 is an illustrative diagrammatical circuit of an embodiment of a tape cartridge rejection apparatus according to the present invention.

In FIG. 3 is shown an electric circuit of an embodiment of the present invention which has overcome such drawback. In this FIG. the same elements as in the circuit shown in FIG. 2 are represented by same numerals.

Figure 4:
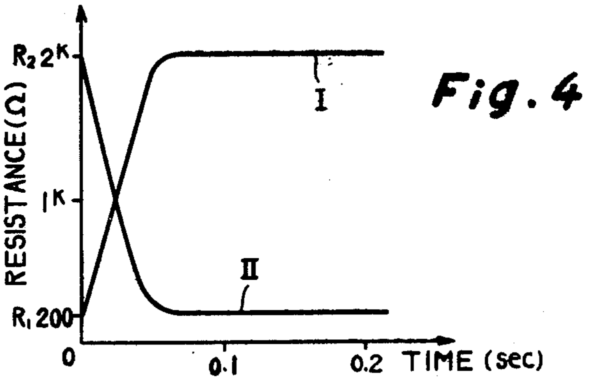
FIG. 4 shows characteristic curves illustrating the resistance value of an incandescent lamp and the current value thereof variable with the lapse of time.

In the embodiment of FIG. 3 there is used an incandescent lamp 43 in place of the resistance 37 of the circuit shown in FIG. 2. Value of internal resistance of the lamp 43 increases as shown in FIG. 4 with the flowing time of electric current, showing variation of characteristic curve indicated by I. When the resistor of the lamp is cool at the initiation of flowing of the electric current, the resistance value $R_1$ of the resistor is approximately 200Ω (Ohm) and when the resistor is heated to a normal temperature after flowing of electric current, the resistance value $R_2$ reaches approximately 2 KΩ.

Operation of the embodiment of FIG. 3 will now be described. Similar to the operation illustrated previously with reference to FIG. 1 and FIG. 2, the cartridge 10 is loaded in the tape player chassis 11 whereupon the power source switch 18 is closed and a closed circuit including an AC power source 33, rectifier 34, lamp 43, solenoid coil 38 and silicon controlled rectifier element (SCR) 39 is formed. When the switch 27 and contact 15 are opened the resistance of the rectifier element 39 in the forward direction is so high that the electric current does not flow in the solenoid coil 38. However, when the switch 27 or the contact 15 is closed, the electric current flows in the gate 39G so that the resistance of the rectifier element 39 in the forward direction is decreased and the current flows into the solenoid coil 38. Consequently, in the normal operation the solenoid 28 operates to rotate the rejection lever 19 rejecting and pushing the tape cartridge 10 out of the tape player unit. Since the lamp 43 remains cool at this time, the condenser 36 is rapidly charged through the internal resistance of the lamp 43 which is low in resistance value ($R_1$=200 Ω) and the apparatus is prepared for the subsequent repetitive operation.

In case the cartridge rejection operation is not completed due to errors as described above in respect to configuration and dimensions of the tape cartridge 10, the cartridge 10 is still loaded in the tape player so that the power source switch 18 does not open with continuous flowing of electric current to the solenoid coil 38.

However the value of internal resistance of the incandescent lamp 43 is low ($R_1$=200) due to low temperature at the beginning of flowing of electric current and increases as shown by the characteristic curve I of FIG. 4 by rising of temperature and with the lapse of time, and in the constant state of increasing of resistance it reaches $R_2$=2 KΩ approximately 10 times of the resistance $R_1$. Consequently the cartridge 10 is not rejected and the switch 18 remains to be closed. Thus by continuous flowing of electric current in the solenoid coil 38 the value of resistance of the incandescent lamp 43 increases with the result that the electric current is automatically restrained or decreased to flow.

Therefore when the condenser 36 is charged, the incandescent lamp 43 is cooled and its resistance value is low so that the period of charging is short in time. On the other hand when the switch 18 is closed in continuity the current is limited to flow in the solenoid coil 38 and varies as shown by characteristic curve II in FIG. 4 owing to large internal resistance of the lighted incandescent lamp 43 which has been increased by rising of temperature. The above-described limited current flows into the solenoid coil 38 and calorific value of said coil is limited to small so that the solenoid coil is prevented from burning.

Furthermore, as the incandescent lamp 43 continues to light during extraordinary operation of the rejection apparatus as described above while the cartridge is not rejected and the power source switch stays closed, the lamp 43 serves as a warning lamp indicating the extraordinary situation. The user of the tape player will thus be warned of the problem.

Constants of the circuit elements of the electrical circuit shown in FIG. 3 are referenced in the following.

| Parts | | Value of resistance or capacitance or inductance |
|---|---|---|
| Numeral: | | |
| 14 | Condenser | 10μf./300 v. |
| 15 | do | 150μf./200 v. |
| 19 | do | 33μf./25 v. |
| 20 | Resistor | 1 KΩ. |
| 21 | do | 10 KΩ/1w. |
| 18 | Solenoid coil | Approximately 110Ω and approximately 80 mH. |

The apparatus as described with reference to the accompanying drawings is of only an embodiment of the present invention and may be modified in various ways without departing from the scope of the invention as defined in the appended claims.

I claim:

1. A tape cartridge rejection apparatus comprising an electric power source; a condenser charged with electricity by applying a voltage from said power source; a solenoid having a solenoid coil and a plunger, mainly actuated and energized by a discharge current from said condenser; a normally-opened switch which is closed when a tape cartridge for reproducing recorded information is loaded in an associated tape player unit, and which thereby makes a closed circuit between said solenoid coil and said power source; a resistor the resistance of value of which varies greatly from a relatively low value at the beginning of flowing of electric current therethrough to a relative large value corresponding to the flowing time of the electric current therethrough; circuit closing means for closing said solenoid coil to said condenser and said power source at a desired or predetermined time during the reproducing operation of the tape cartridge; said resistor being connected in series to said solenoid coil through which is applied an electric charge to said condenser from said power source; and means for rejecting said tape cartridge and pushing the same out of said tape player unit in response to a motion of said plunger when said solenoid is actuated.

2. A tape cartridge rejection apparatus as claimed in claim 1 in which said resistor is an incandescent lamp, and said lamp continues to light while said solenoid coil is closed to said power source through said normally-opened switch, said closing means and said lamp and to show the state that said tape cartridge is not rejected and said normally-opened switch remains to be closed in spite of the closing operation of said closing means.

3. A tape cartridge rejection apparatus as claimed in claim 1 in which said resistor has a variation of resistance value corresponding to the flowing time of electric current so as to ensure the resistance value in the normal state after flowing of electric current to be in the order about ten times the resistance value at the beginning of flowing of electric current.

4. A tape cartridge rejection apparatus as claimed in claim 1 wherein said circuit closing means comprises a switch which is closed at a desired or predetermined time during the reproducing operation of the tape cartridge and a controlled rectifier element actuated by closing said switch to make a rectifier operation.

5. A tape cartridge rejection apparatus comprising an AC power source; a rectifier for rectifying AC current from said power source; a condenser charged with electricity by applying DC voltage rectified by said rectifier; a solenoid having a solenoid coil and a plunger mainly actuated and energized by a discharge current of said condenser; first normally-opened switch means closed by said tape cartridge when said tape cartridge is loaded in an associated tape player unit for closing a circuit between said solenoid coil and said power source; an incandescent lamp, the resistance value of which varies greatly from a relatively low value at the beginning of flowing of electric current therethrough to a relatively large value corresponding to the flowing time of the electric current therethrough; said lamp being lighted by the electric current; second normally-opened switch means closed at a desired or predetermined time during the reproducing operation of said tape cartridge; a silicon controlled rectifier element including a gate electrode which is connected to said second normally-opened switch means and starts to rectify by a gate current supplied by closing said second switch means; said first normally-opened switch means, said solenoid, said silicon controlled rectifier element, said lamp, and said rectifier being connected in series to said AC power source; said condenser being connected to be charged with electricity through said lamp; and means for rejecting said tape cartridge and pushing the same out of the tape player unit in response to a motion of said plunger when said solenoid is actuated.

6. A tape cartridge rejection apparatus as claimed in claim 5 wherein said first normally-opened switch means is closed by engagement with the outer periphery of said cartridge when said tape cartridge is loaded in said tape player unit and opened when said cartridge is rejected and pushed out of said player unit.

7. A tape cartridge rejection apparatus as claimed in claim 5 wherein said second normally-opened switch means comprises a contact substantially electrically closed at a predetermined time by contact with a conductive sensing tape adhered at a position on the tape corresponding to the termination of reproducing operation of recorded information on said tape cartridge and a switch connected in parallel to said contact and manually closed at a desired time.